(12) United States Patent
Ueda

(10) Patent No.: US 10,906,424 B2
(45) Date of Patent: *Feb. 2, 2021

(54) SYSTEM FOR ANNOUNCING PREDICTED REMAINING AMOUNT OF ENERGY

(71) Applicant: Nissan Motor Co., Ltd., Yokohama (JP)

(72) Inventor: Kyohei Ueda, Kanagawa (JP)

(73) Assignee: Nissan Motor Co., Ltd., Yokohama (JP)

(*) Notice: Subject to any disclaimer, the term of this patent is extended or adjusted under 35 U.S.C. 154(b) by 252 days.

This patent is subject to a terminal disclaimer.

(21) Appl. No.: 16/044,782

(22) Filed: Jul. 25, 2018

(65) Prior Publication Data

US 2018/0345814 A1 Dec. 6, 2018

Related U.S. Application Data

(63) Continuation of application No. 14/907,099, filed as application No. PCT/JP2014/064858 on Jun. 4, 2014, now Pat. No. 10,166,880.

(30) Foreign Application Priority Data

Jul. 25, 2013 (JP) .................................. 2013-154300

(51) Int. Cl.
*B60L 53/65* (2019.01)
*G01C 21/34* (2006.01)
(Continued)

(52) U.S. Cl.
CPC ........... *B60L 53/65* (2019.02); *B60L 11/1861* (2013.01); *G01C 21/3469* (2013.01); G06Q 30/0639; G06Q 50/30; G09B 29/003; G09B 29/10

USPC .......................................................... 701/22
See application file for complete search history.

(58) Field of Classification Search
CPC ...... B60L 58/12; B60L 11/1861; B60L 53/65; G01C 21/3469; G01C 21/3697;
(Continued)

(56) References Cited

U.S. PATENT DOCUMENTS 8,364,388 B2 * 1/2013 Naito .................. G01C 21/343
701/439
8,407,002 B2 3/2013 Mori
(Continued)

FOREIGN PATENT DOCUMENTS

DE 102010062252 A1 1/2012
DE 102011015777 A1 10/2012
(Continued)

*Primary Examiner* — Peter D Nolan
*Assistant Examiner* — Luke Huynh
(74) *Attorney, Agent, or Firm* — Young Basile Hanlon & MacFarlane, P.C.

(57) ABSTRACT

A system for generating information about predicted remaining amount of energy includes processing circuitry that obtains traveling state information which contains current vehicle position information, searches a predicted passage point through which the vehicle is predicted to pass in a future on a basis of the traveling state information when a vehicle traveling route is not set, predicts a predicted remaining amount of energy, the predicted remaining amount of energy being a predicted amount of traveling energy remaining at the time when the vehicle passes the predicted passage point and controls to provide information about the predicted remaining amount of energy and the predicted passage point corresponding to the predicted remaining amount of energy for a user.

11 Claims, 8 Drawing Sheets

(51) Int. Cl.
  *G01C 21/36* (2006.01)
  *G09B 29/10* (2006.01)
  *G09B 29/00* (2006.01)
  *G06Q 50/30* (2012.01)
  *B60L 11/18* (2006.01)
  *G06Q 30/06* (2012.01)

(52) U.S. Cl.
  CPC ..... *G01C 21/3697* (2013.01); *G06Q 30/0639* (2013.01); *G06Q 50/30* (2013.01); *G09B 29/003* (2013.01); *G09B 29/10* (2013.01); *B60L 2240/12* (2013.01); *B60L 2240/26* (2013.01); *B60L 2240/622* (2013.01); *B60L 2240/68* (2013.01); *B60L 2240/70* (2013.01); *B60L 2250/16* (2013.01); *B60L 2260/52* (2013.01); *B60L 2260/54* (2013.01); *G09B 29/007* (2013.01); *Y02T 10/70* (2013.01); *Y02T 10/7072* (2013.01); *Y02T 10/72* (2013.01); *Y02T 90/12* (2013.01); *Y02T 90/14* (2013.01); *Y02T 90/16* (2013.01); *Y02T 90/167* (2013.01); *Y04S 30/14* (2013.01)

(56) References Cited

U.S. PATENT DOCUMENTS

| | | | |
|---|---|---|---|
| 8,412,476 | B2 | 4/2013 | Kato |
| 9,170,118 | B2 * | 10/2015 | Kiyama ............. G01C 21/3469 |
| 9,758,145 | B2 | 9/2017 | Yoshikawa et al. |
| 9,759,572 | B2 * | 9/2017 | Okada ................. B60L 58/12 |
| 10,166,880 | B2 * | 1/2019 | Ueda ................ G01C 21/3697 |
| 2010/0094496 | A1 | 4/2010 | Hershkovitz et al. |
| 2011/0087390 | A1 * | 4/2011 | Pandit ................. B60W 20/14 701/22 |
| 2012/0004838 | A1 * | 1/2012 | Lee ................ G08G 1/096844 701/123 |
| 2012/0066232 | A1 | 3/2012 | Engelhardt et al. |
| 2012/0173135 | A1 | 7/2012 | Gutman |
| 2012/0221234 | A1 | 8/2012 | Sujan et al. |
| 2013/0245945 | A1 | 9/2013 | Morita et al. |
| 2014/0052373 | A1 | 2/2014 | Hoch et al. |
| 2014/0191722 | A1 * | 7/2014 | Usuki ................. B60L 53/305 320/109 |
| 2015/0298565 | A1 * | 10/2015 | Iwamura ............... B60L 58/12 701/22 |
| 2015/0306961 | A1 * | 10/2015 | Strasser ................. B60L 3/12 701/22 |

FOREIGN PATENT DOCUMENTS

| | | |
|---|---|---|
| EP | 2608146 A1 | 6/2013 |
| EP | 2759977 A1 | 7/2014 |
| JP | 2001183150 A | 7/2001 |
| JP | 2012066705 A | 4/2012 |
| JP | 2012211888 A | 11/2012 |
| JP | 2013002932 A | 1/2013 |
| WO | 2012097184 A1 | 7/2012 |

* cited by examiner

SYSTEM FOR ANNOUNCING PREDICTED REMAINING AMOUNT OF ENERGY

CROSS REFERENCE TO RELATED APPLICATION

This application is a continuation of U.S. patent application Ser. No. 14/907,099, filed on Jan. 22, 2016, which is a 371 of PCT/JP2014/064858 filed Jun. 4, 2014, which claims priority to Japanese Patent Application No. 2013-154300, filed on Jul. 25, 2013, all incorporated herein in their entirety.

TECHNICAL FIELD

The present invention relates to a system for announcing a predicted remaining amount of energy used to announce the amount of traveling energy of a vehicle in a future to a user.

BACKGROUND

In a navigation system boarded on a vehicle, an art is known that the amount of traveling energy necessary for the vehicle to reach a destination is calculated on the basis of information about a road on a traveling route set for the vehicle in advance (see Japanese Patent Application Publication No. 2010-210271 A).

However, in the art disclosed in Japanese Application Publication No. 2010-210271, what is calculated is only the amount of traveling energy necessary for the vehicle to reach the destination. For that reason, according to the art described in Japanese Application Publication No. 2010-210271, a problem arises in that a user cannot know a predicted remaining amount of traveling energy while a user drives the vehicle.

SUMMARY

Problems to be solved by the present invention include providing a system for announcing a predicted remaining amount of energy capable of announcing information about a predicted remaining amount of traveling energy to a user while the user drives the vehicle.

The present invention solves the problem as below. On the basis of the information of a current vehicle position, a predicted passage point through which the vehicle is predicted to pass is searched. On the assumption that the vehicle passes through the predicted passage point, a predicted amount of remaining energy at the time when the vehicle passes through the predicted passage point is predicted as a predicted remaining amount of energy. The information about the predicted remaining amount of energy is announced to the user along with the information about the predicted passage point.

According to the present invention, it is possible to announce the information about the predicted remaining amount of energy at the point through which the vehicle is predicted to pass to the user. For that reason, the user can obtain the information about the predicted remaining amount of energy while the user drives the vehicle, and hence can easily make a plan for the supplement of the traveling energy.

DETAILED DESCRIPTION OF THE EMBODIMENTS

Hereinafter, an embodiment of the present invention will be described with reference to the drawings.

Figure 1:
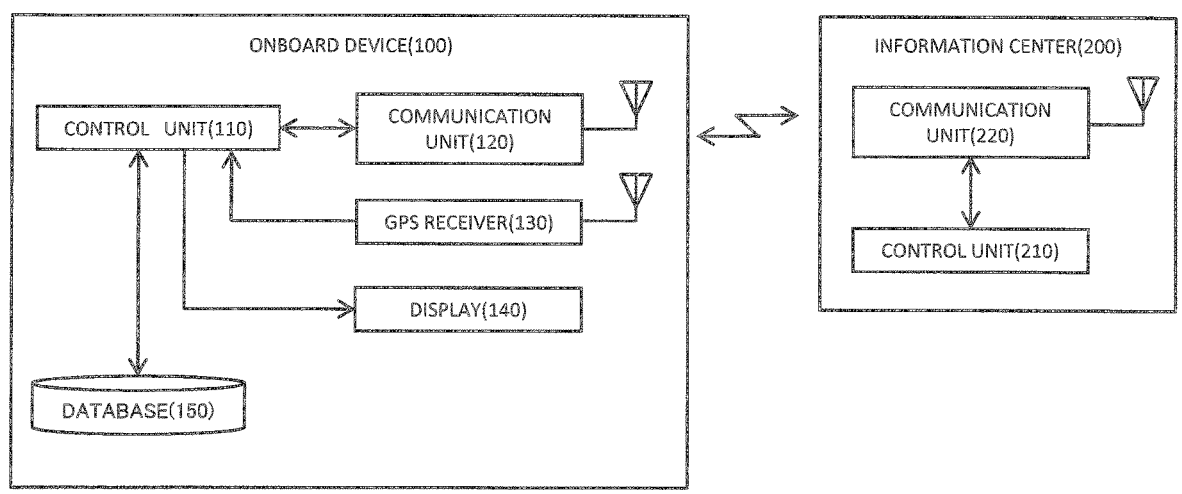
FIG. 1 is a configuration diagram illustrating a system for announcing a predicted remaining amount of energy according to an embodiment.

FIG. 1 is a configuration diagram illustrating a system for announcing a predicted remaining amount of energy according to the present embodiment. As illustrated in FIG. 1, the system for announcing the predicted remaining amount of energy according to the present embodiment includes an onboard device 100 which is boarded on a vehicle driven by a battery and an information center 200 provided outside the vehicle.

As illustrated in FIG. 1, the onboard device 100 can exchange information with the information center 200 via a communication between the onboard device and the information center. The onboard device 100 obtains real-time traffic information in each road by a radio communication with the information center 200. As the real-time traffic information, for example, the information of a real-time traveling speed of a vehicle other than an own vehicle traveling on each road can be exemplified. Further, the example illustrated in FIG. 1 is that the onboard device 100 communicates with one information center 200. In the present embodiment, the onboard device 100 may communicate with a plurality of the information centers 200.

The onboard device 100 is boarded on a vehicle driven by a battery. The onboard device 100 displays the information of a predicted passage point through which the vehicle is predicted (or expected) to pass in a future on a display 140. Further, the onboard device 100 displays information of a remaining battery amount obtained when the vehicle is predicted (or expected) to pass through a predicted passage point as a predicted remaining battery amount $E_{bat}$ on the display 140. As illustrated in FIG. 1, the onboard device 100 includes a control unit 110, a communication unit 120, a GPS receiver 130, the display 140, and a database 150. The control unit 110, the communication unit 120, the GPS receiver 130, the display 140, and the database 150 are connected to one another via a CAN (Controller Area Network) or other onboard LANs so as to exchange information.

The communication unit 120 transmits and receives information to and from a communication unit 220 provided in the information center 200 by a radio communication.

Specifically, the communication unit 120 receives real-time traffic information in each road by a radio communication from the communication unit 220 provided in the information center 200. Here, as the real-time traffic information to be received, for example, the real-time vehicle speed information of a vehicle traveling on each road can be exemplified.

The database 150 stores own vehicle information, map information, and vehicle traffic information. As the own vehicle information, the weight of the vehicle, the size (the width, the height, and the length) of the vehicle, the air resistance coefficient (Cd value) of the vehicle, the driving efficiency of the motor of the vehicle, and the power consumption efficiency of the onboard electrical component (the cooler or the air conditioner, the audio, etc.) can be exemplified. As the map information, for example, map data containing the information of the distance of each road, the slope of the road, and the road category (category such as an ordinary road or a highway) can be exemplified. As the vehicle traffic information, for example, statistical data of the speed of the vehicle on each road can be exemplified. For example, such statistical data is created on the basis of data collected in each road for the real-time vehicle speed information transmitted from the information center 200 or data collected in each road for the vehicle speed obtained when the own vehicle travels on each road.

The control unit 110 includes, for example, a ROM that stores a program, a CPU that executes the program stored in the ROM, and a RAM that serves as an accessible storage unit.

The control unit 110 searches a predicted passage point through which the vehicle is predicted (or expected) to pass in a future. Next, the control unit 110 predicts (or estimates) the predicted remaining battery amount $E_{bat}$ at the time when the vehicle is predicted (or expected) to pass through a predicted passage point. Further, the control unit 110 announces the information of the predicted remaining battery amount $E_{bat}$ to the user along with the information of the predicted passage point.

The control unit 110 has the following functions in order to search the predicted passage point and predicts (or estimates) the predicted remaining battery amount $E_{bat}$ so that the information of the searched predicted passage point and the predicted remaining battery amount $E_{bat}$ is announced to the user. Specifically, the control unit 110 has a battery information obtaining function, a traveling state information obtaining function, a predicted passage point searching function, a power consumption amount predicting (or estimating) function, a remaining energy amount predicting (or estimating) function, and a display function. The control unit 110 can execute the above-described functions by the cooperation of software and hardware for realizing the above-described functions.

Hereinafter, the functions realized by the control unit 110 will be described.

The battery information obtaining function of the control unit 110 is a function of obtaining the information of the battery provided in the vehicle by the use of sensors provided in the vehicle through a CAN or onboard LANs. The information of the battery obtained by the remaining battery amount obtaining function contains the information of the current remaining battery amount. Further, the information of the battery obtained by the remaining battery amount obtaining function may contain the information of the current degradation degree of the resistance value of the battery.

The traveling state information obtaining function of the control unit 110 is a function of obtaining the information of the current vehicle position, the current vehicle traveling direction, and the current vehicle traveling road category as the traveling state information. Here, current vehicle position information can be obtained, for example, by receiving radio waves transmitted from a positioning satellite by the GPS receiver 130. Further, the current vehicle traveling direction information can be obtained, for example, by specifying the direction of the vehicle on the basis of the current vehicle position information detected every predetermined time. The information of the road category (category such as an ordinary road or a highway) on which the vehicle currently travels can be obtained, for example, by specifying the road on which the vehicle currently travels on the basis of the current vehicle position information detected every predetermined time. Alternatively, the road category information on which the vehicle currently travels can be obtained by detecting the vehicle speed on the basis of the current vehicle position information detected every predetermined time and specifying the ordinary road or the highway on which the vehicle travels.

The predicted passage point searching function of the control unit 110 is a function of searching the predicted passage point through which the vehicle is predicted (or expected) to pass in a future on the basis of the traveling state information.

In the present embodiment, when the vehicle traveling route is not set, the predicted passage point is searched, for example, as below. First, the control unit 110 determines whether the road on which the vehicle currently travels is the ordinary road or the highway on the basis of the traveling state information. Then, when it is determined that the road on which the vehicle currently travels is the ordinary road, the control unit 110 searches a main crossroad located at the front side of the road in the vehicle traveling direction as the predicted passage point through which the vehicle is predicted (or expected) to pass in a future.

Figure 2:
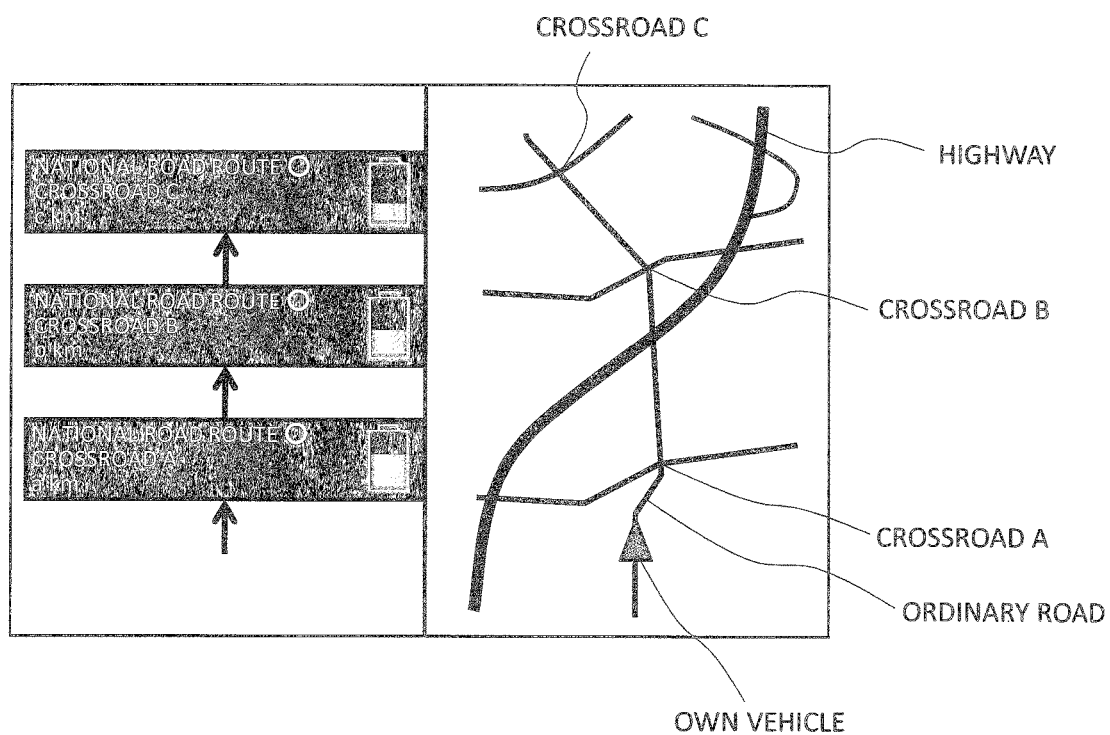
FIG. 2 is a diagram illustrating an example of a method of displaying the information of a predicted passage point and a predicted remaining battery amount $E_{bat}$ when a vehicle travels on an ordinary road.

Here, FIG. 2 is a diagram illustrating an example of displaying the information of the predicted passage point on the display 140 when the road on which the vehicle currently travels is an ordinary road. Further, in the map of FIG. 2, the ordinary road is indicated by a thin line, and the highway is indicated by a thick line. Further, in the map of FIG. 2, a triangular icon on the map indicates current position of the own vehicle, and the direction of the vertex of the triangular icon indicates traveling direction of the own vehicle.

In the present embodiment, as illustrated in FIG. 2, when the road on which the vehicle currently travels is the ordinary road, a main crossroad (a crossroad A, a crossroad B, and a crossroad C) existing at the front side of the road in the vehicle traveling direction is searched as the predicted passage point. As the main crossroad searched as the predicted passage point, for example, a crossroad with a national road on the road on which the vehicle currently travels or a crossroad with a road having a predetermined number or more of lanes (for example, a road having four or more lanes) can be exemplified.

The power consumption amount predicting (or estimating) function of the control unit 110 is a function of predicting (or estimating) the amount of power necessary for the vehicle to travel from the current position to the predicted passage point as the predicted power consumption amount. Specifically, the control unit 110 reads out the own vehicle information and statistical data of the distance, the slope, and the vehicle speed from the current vehicle position to the predicted passage point on the road from the information stored in the database 150, and predicts (or estimates) the predicted power consumption amount on the basis of the read information.

For example, in the scene illustrated in FIG. 2, the control unit 110 first reads out the own vehicle information and statistical data of the distance, the slope, and the vehicle speed from the current vehicle position to the crossroad A on the road from the information stored in the database 150, and predicts (or estimates) the predicted power consumption amount from the current vehicle position to the crossroad A on the basis of the read information. Then, the control unit 110 similarly predicts (or estimates) the predicted power consumption amount from the current vehicle position to the crossroad B and the predicted power consumption amount from the current vehicle position to the crossroad C.

In addition, in the present embodiment, the predicted power consumption amount may be predicted (or estimated) in consideration of the traffic jam information and the information of weather and external air temperature. Here, the control unit 110 can obtain the traffic jam information and the information of weather and external air temperature by, for example, the communication unit 120 via the information center 200 or the Internet. Alternatively, the traffic jam information and the information of weather and external air temperature may be obtained by a sensor provided in the vehicle immediately before the control unit 110 predicts (or estimates) the predicted power consumption amount.

Alternatively, in the present embodiment, the control unit 110 may predict (or estimate) the predicted power consumption amount in consideration of the battery capacity reduction state (that is, the battery capacity reduction amount per unit time) immediately before the prediction (or estimation) of the predicted power consumption amount.

The remaining energy amount predicting (or estimating) function of the control unit 110 is a function of predicting (or estimating) the predicted value of the remaining battery amount at the time when the vehicle passes through the predicted passage point on the assumption that the vehicle passes through the predicted passage point as the predicted remaining battery amount $E_{bat}$. Specifically, the control unit 110 obtains the predicted remaining battery amount $E_{bat}$ in a manner such that the predicted power consumption amount predicted (or estimated) by the power consumption amount predicting (or estimating) function is subtracted from the current remaining battery amount obtained in the battery information obtaining function.

An example of the scene illustrated in FIG. 2 will be described. In the scene illustrated in FIG. 2, the control unit 110 predicts (or estimates) the predicted power consumption amount from the current vehicle position to the crossroad A by the power consumption amount predicting (or estimating) function. For that reason, the control unit 110 can obtain the predicted remaining battery amount $E_{bat\_A}$ at the crossroad A in a manner such that the predicted power consumption amount from the current vehicle position to the crossroad A is subtracted from the current remaining battery amount obtained by the battery information obtaining function. Then, the control unit 110 similarly predicts (or estimates) the predicted remaining battery amount $E_{bat\_B}$ at the crossroad B and the predicted remaining battery amount $E_{bat\_C}$ at the crossroad C.

In addition, in the present embodiment, the control unit 110 may predict (or estimate) the predicted remaining battery amount $E_{bat}$ in consideration of the information of the current degradation degree of the resistance value of the battery. At this time, the control unit 110 obtains the information of the current degradation degree of the resistance value of the battery in addition to the information of the current remaining battery amount by the battery information obtaining function. Then, the control unit 110 predicts (or estimates) the predicted remaining battery amount $E_{bat}$ on the basis of the predicted power consumption amount and the information of the remaining battery amount and the degradation degree of the resistance value thus obtained.

The display function of the control unit 110 is a function of announcing the information of the predicted passage point and the predicted remaining battery amount $E_{bat}$ to the user in a manner such that the information of the predicted remaining battery amount $E_{bat}$ is displayed on the display 140 along with the information of the corresponding predicted passage point.

In the present embodiment, as illustrated in FIG. 2, the control unit 110 displays a map on the right side of the screen of the display 140, and displays the information of the crossroad A, the crossroad B, and the crossroad C as the predicted passage points (for example, the information of the road name, the crossroad name, and the distance from the current vehicle position) on the left side of the screen. Then, as illustrated in FIG. 2, the control unit 110 displays the information of the predicted remaining battery amount $E_{bat}$ on the display 140 along with the information of the predicted passage point by the battery icon. Here, the battery icon in FIG. 2 indicates a state in which the predicted remaining battery amount $E_{bat}$ increases in accordance with an increase in the size of the white portion inside the battery, and hence the user can visually recognize whether the predicted remaining battery amount $E_{bat}$ is large or small.

In the present embodiment, the information of the crossroad A, the information of the corresponding predicted remaining battery amount $E_{bat\_A}$, the information of the crossroad B, the information of the corresponding predicted remaining battery amount $E_{bat\_B}$, the information of the crossroad C, and the information of the corresponding predicted remaining battery amount $E_{bat\_C}$ are displayed on the display 140. Accordingly, the information of the predicted passage point and the predicted remaining battery amount $E_{bat}$ is appropriately announced to the user.

For that reason, according to the present embodiment, even when the vehicle traveling route is not set, the main crossroad through which the vehicle is expected to pass in a future is searched as the predicted passage point, and the information of the predicted remaining battery amount $E_{bat}$ at the predicted passage point is announced to the user along with the information of the corresponding predicted passage point. For that reason, the user can easily make a plan for charging the battery while referring to the information of the predicted remaining battery amount $E_{bat}$ at such a main crossroad.

FIG. 2 illustrates an example in which the control unit 110 displays the map on the right side of the screen of the display 140 and displays the information of the predicted passage point and the predicted remaining battery amount $E_{bat}$ on the left side of the screen. However, in the present embodiment, the display on the display 140 is not limited to such an example. For example, the control unit 110 may display the information of the predicted passage point and the predicted remaining battery amount $E_{bat}$ on the map in a superimposed state.

Further, when the control unit 110 displays the information of the predicted passage point and the predicted remaining battery amount $E_{bat}$, it is desirable that the information of the predicted passage point be displayed in a shape allowing the position of the predicted passage point to be recognized and the information of the predicted remaining battery amount $E_{bat}$ be displayed so as to correspond to the information of the predicted passage point. For example, in FIG. 2, the control unit 110 can display the information of the predicted passage point in a shape allowing the position of the predicted passage point to be recognized in a manner such that the information of the crossroad A and the line connecting the position of the crossroad A on the map are displayed on the display 140. Further, as illustrated in FIG. 2, the control unit 110 can display the information of the predicted remaining battery amount $E_{bat}$ so as to correspond to the information of the predicted passage point in a manner such that the battery icon indicating the information of the predicted remaining battery amount $E_{bat}$ is displayed in the periphery of the information of the predicted passage point. Accordingly, the user can intuitively recognize the information of the predicted passage point and the predicted remaining battery amount $E_{bat}$, and hence the information of the predicted passage point and the predicted remaining battery amount $E_{bat}$ is more efficiently announced.

Further, in the present embodiment, when the control unit 110 displays the information of the predicted passage point and the predicted remaining battery amount $E_{bat}$ on the display 140, the information of the charging facility existing within a predetermined distance from the predicted passage point may be also displayed. For example, the control unit 110 can obtain the information of the charging facility by the communication unit 120 via the information center 200 or the Internet, search the charging facility existing within a predetermined distance from the predicted passage point on the basis of the obtained information, and display the information of the charging facility by a method of disposing an icon indicating the charging facility at a position on which the searched charging facility exists on the map of the display 140. The predetermined distance is not particularly limited, and may be set to, for example, about 1 to 10 km. Accordingly, the user can recognize the information of the charging facility in the periphery of the predicted passage point in addition to the information of the predicted passage point and the predicted remaining battery amount $E_{bat}$, and hence more easily make a plan for charging the battery.

Further, when the control unit 110 displays the information of the charging facility on the display 140, the specific information of the selected charging facility may be displayed in a manner such that the onboard device 100 is operated to select the charging facility from the display on the display 140 by the user. As the specific information of the displayed charging facility, for example, the traveling guidance information such as the distance or the elapse time from the current vehicle position to the selected charging facility, the information such as the operating hours or the current operating state of the charging facility, and the facility information such as the charger type or the number of charging ports can be exemplified.

Further, when the control unit 110 displays the information of the charging facility on the display 140, only the charging facility usable at the predicted passage time in which the vehicle passes through the predicted passage point may be displayed among the charging facilities existing within a predetermined distance from the predicted passage point. That is, the control unit 110 predicts (or estimates) the predicted passage time in advance on the assumption that the vehicle passes through the predicted passage point. Subsequently, the control unit 110 may search the charging facility existing within a predetermined distance from the predicted passage point and usable at the predicted passage time and display only the searched charging facility on the display 140. Here, as the usable charging facility, for example, the charging facility operated at the predicted passage time can be exemplified. Accordingly, the user can recognize the information of the charging facility which is likely usable when the vehicle reaches the predicted passage point in addition to the information of the predicted passage point and the predicted remaining battery amount $E_{bat}$, and hence reliably make a plan for charging the battery.

Next, the information center 200 illustrated in FIG. 1 will be described. The information center 200 is a server which transmits the real-time vehicle speed information of the vehicle traveling on each road as the traffic information to the onboard device 100. As illustrated in FIG. 1, the information center 200 includes a control unit 210 and the communication unit 220.

The communication unit 220 is a unit which transmits and receives information to and from the communication unit 120 provided in the onboard device 100 by a radio communication. Specifically, the communication unit 220 receives the real-time vehicle speed information obtained for each road by the control unit 210. Then, the communication unit 220 transmits the received information to the communication unit 120 provided in the onboard device 100 by the instruction of the control unit 210.

The control unit 210 includes, for example, a ROM which stores a program, a CPU which executes the program stored in the ROM, and a RAM which serves as an accessible storage unit.

The control unit 210 obtains the real-time vehicle speed information of the currently traveling vehicle for each road and transmits the obtained vehicle speed information to the communication unit 120 provided in the onboard device 100 via the communication unit 220. The method in which the control unit 210 obtains the real-time vehicle speed information is not particularly limited. For example, a method of receiving the real-time vehicle speed information from the onboard device 100 or a method of collecting the vehicle speed information obtained by a sensor provided in each road through a radio communication can be exemplified.

Further, the control unit 210 may transmit the information (the traffic jam information, the information of weather and external air temperature, the charging facility information, and so on) obtained via the internet to the communication unit 120 provided in the onboard device 100 via the communication unit 220 in addition to the real-time vehicle speed information.

In the present embodiment, information of the predicted passage point and the predicted remaining battery amount $E_{bat}$ is announced to the user as described above.

FIG. 2 illustrates an example of searching the predicted passage point and predicting (or estimating) the predicted remaining battery amount $E_{bat}$ when the vehicle travels on the ordinary road. In the present embodiment, even when the vehicle travels on the highway, similarly the predicted passage point is searched and the predicted remaining battery amount $E_{bat}$ is predicted (or estimated).

Specifically, when the vehicle travels on the highway, the control unit 110 searches the predicted passage point as below by the predicted passage point searching function.

First, the control unit 110 determines whether the road on which the vehicle currently travels is the ordinary road or the highway on the basis of the traveling state information obtained by the traveling state information obtaining function. Then, when it is determined that the road on which the vehicle currently travels is the highway, the control unit 110 searches an interchange (IC), a service area (SA), and a parking area (PA) (i.e. a rest area) located at the front side of the highway in the vehicle traveling direction as the predicted passage points.

Figure 3:
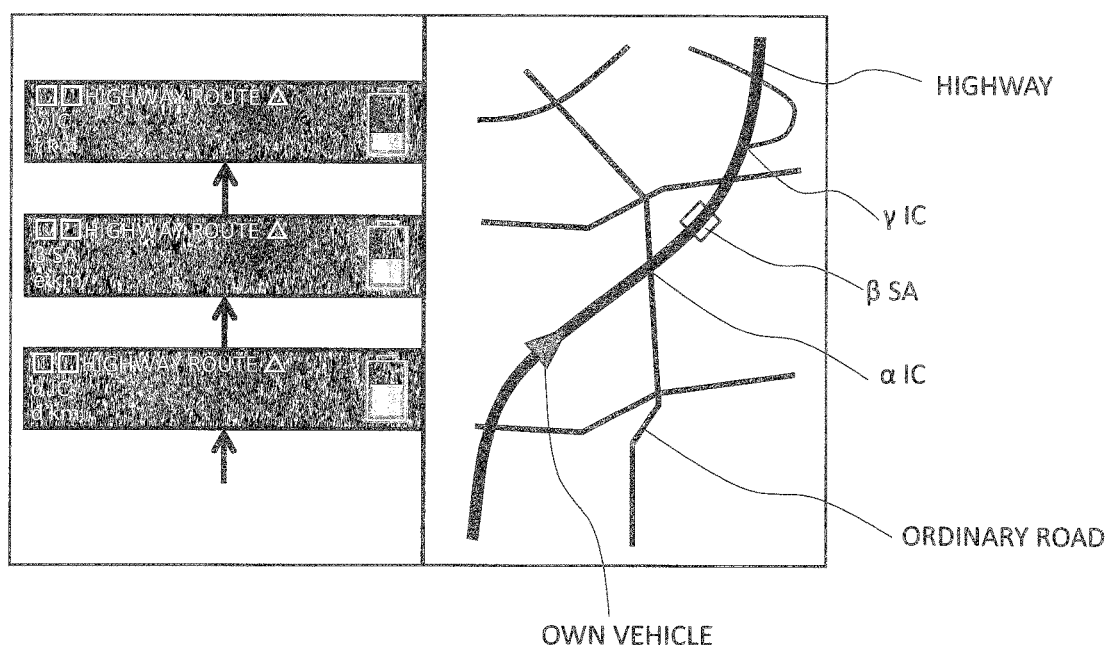
FIG. 3 is a diagram illustrating an example of a method of displaying the information of a predicted passage point and a predicted remaining battery amount $E_{bat}$ when a vehicle travels on a highway.

Here, FIG. 3 is a diagram illustrating an example of displaying the information of the predicted passage point on the display 140 when the road on which the vehicle currently travels is the highway. As illustrated in FIG. 3, when the road on which the vehicle currently travels is the highway, the control unit 110 searches points αIC, βSA, and γIC located at the front side of the road in the vehicle traveling direction as the predicted passage points.

Further, the control unit 110 predicts (or estimates) the amount of power necessary for the vehicle to travel from the current position to the predicted passage point as the predicted power consumption amount by the power consumption amount predicting (or estimating) function. For example, in the scene illustrated in FIG. 3, the control unit 110 first reads out the own vehicle information and statistical data of the distance, the slope, and the vehicle speed on the road from the current vehicle position to the point αIC from the information stored in the database 150. Then, the control unit 110 predicts (or estimates) the predicted power consumption amount from the current vehicle position to the point αIC on the basis of the read information. Then, the control unit 110 similarly predicts (or estimates) the predicted power consumption amount from the current vehicle position to the point βSA and the predicted power consumption amount from the current vehicle position to the point γIC.

Next, the control unit 110 predicts (or estimates) the predicted remaining battery amount $E_{bat}$ when the vehicle passes through the predicted passage point by the remaining energy amount predicting (or estimating) function on the assumption that the vehicle passes through the predicted passage point. For example, in the scene illustrated in FIG. 3, since the predicted power consumption amount from the current vehicle position to the point αIC is predicted (or estimated), the control unit 110 can obtain the predicted remaining battery amount $E_{bat\_\alpha}$ at the point αIC in a manner such that the predicted power consumption amount is subtracted from the current remaining battery amount obtained by the battery information obtaining function. Then, the control unit 110 similarly predicts (or estimates) the predicted remaining battery amount $E_{bat\_\beta}$ at the point βSA and the predicted remaining battery amount $E_{bat\_\gamma}$ at the point γIC.

In the present embodiment, the control unit 110 searches the predicted passage point and predicts (or estimates) the predicted remaining battery amount $E_{bat}$ when the vehicle travels on the highway as described above. Then, the information of the searched predicted passage point and the information of the predicted (or estimated) predicted remaining battery amount $E_{bat}$ are displayed on the display 140 by the display function of the control unit 110, for example, as illustrated in FIG. 3 so as to be announced to the user.

Accordingly, even when the vehicle traveling route is not set, the control unit 110 can search the service area (SA), the parking area (PA), or the interchange (IC) through which the vehicle is expected to pass in a future as the predicted passage point. Then, the control unit 110 announces the information of the predicted remaining battery amount $E_{bat}$ to the user along with the information of the corresponding predicted passage point. For that reason, the user can easily make a plan for charging the battery while referring to the information of the predicted remaining battery amount $E_{bat}$ at the main point such as SA, PA, or IC.

FIGS. 2 and 3 illustrate an example of searching the predicted passage point and predicting (or estimating) the predicted remaining battery amount $E_{bat}$ when the vehicle traveling route is not set. However, in the present embodiment, the control unit 110 can similarly search the predicted passage point and predict (or estimate) the predicted remaining battery amount $E_{bat}$ even when the vehicle traveling route is set in advance.

Specifically, when the vehicle traveling route is set in advance, the control unit 110 searches the predicted passage point as below by the predicted passage point searching function. First, the control unit 110 specifies a section in the ordinary road and a section in the highway on the vehicle traveling route. Then, the control unit 110 searches the main crossroad as the predicted passage point in the section of the ordinary road on the traveling route and searches the point such as SA, PA, or IC as the predicted passage point in the section of the highway on the traveling route.

Figure 4:
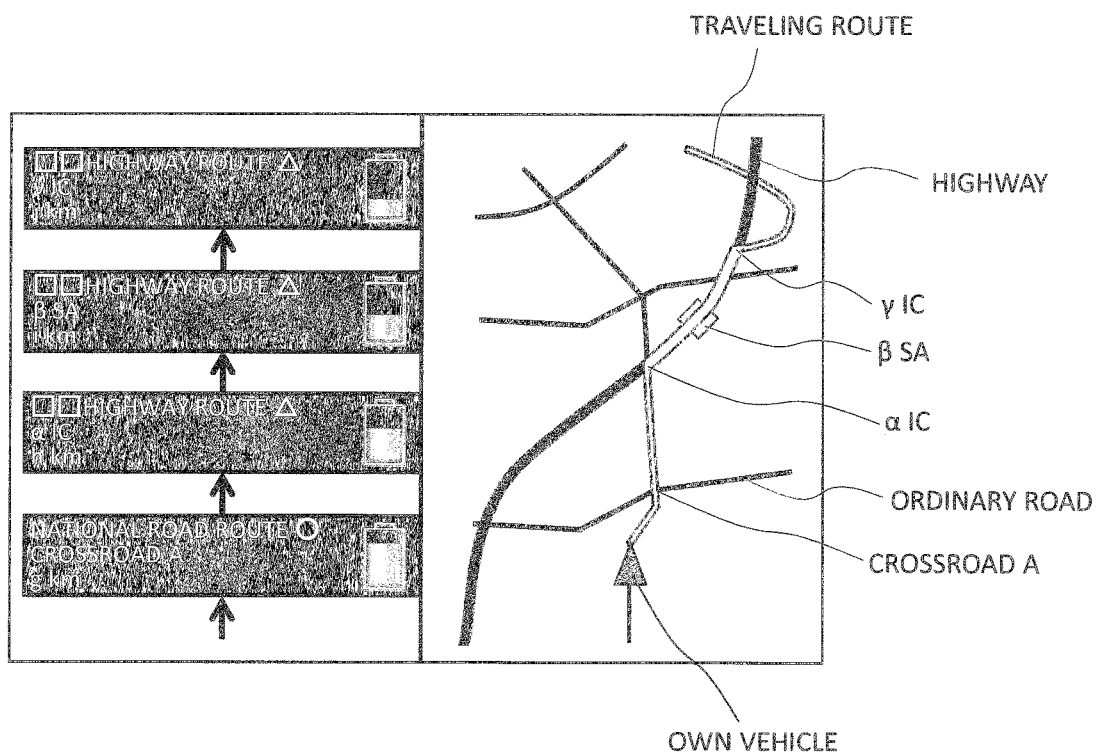
FIG. 4 is a diagram illustrating an example of a method of displaying the information of a predicted passage point and a predicted remaining battery amount $E_{bat}$ when a vehicle traveling route is set.

Here, FIG. 4 is a diagram illustrating an example of displaying the information of the predicted passage point on the display 140 when the vehicle traveling route is set in advance. In FIG. 4, the traveling route set for the vehicle is indicated by a white bold line. In the example illustrated in FIG. 4, the control unit 110 searches the crossroad A as the predicted passage point in the section of the ordinary road on the traveling route (that is, the section from the current vehicle position to the point αIC and the section after the point γIC in FIG. 4) and searches the points αIC, βSA, and γIC as the predicted passage points in the section of the highway on the traveling route (that is, the section from the point αIC to the point γIC in FIG. 4).

Further, the control unit 110 predicts (or estimates) the predicted power consumption amount from the current vehicle position to each predicted passage point by the power consumption amount predicting (or estimating) function. For example, in the scene illustrated in FIG. 4, the control unit 110 predicts (or estimates) the predicted power consumption amount from the current vehicle position as the starting point to the crossroad A, the predicted power consumption amount from the current vehicle position to the point αIC, the predicted power consumption amount from the current vehicle position to the point βSA, and the predicted power consumption amount from the current vehicle position to the point γIC by the above-described method.

Next, the control unit 110 predicts (or estimates) the predicted remaining battery amount $E_{bat}$ at each predicted passage point by the remaining energy amount predicting (or estimating) function. For example, in the scene illustrated in FIG. 4, the control unit 110 predicts (or estimates) the predicted remaining battery amount $E_{bat\_A}$ at the crossroad A, the predicted remaining battery amount $E_{bat\_\alpha}$ at the point αIC, the predicted remaining battery amount $E_{bat\_\beta}$ at the point βSA, and the predicted remaining battery amount $E_{bat\_\gamma}$ at the point γIC by the above-described method.

As described above, the control unit 110 searches the predicted passage point and predicts (or estimates) the predicted remaining battery amount $E_{bat}$ on the assumption that the vehicle traveling route is set in advance. Then, the information of the predicted passage point and the information of the predicted remaining battery amount $E_{bat}$ are displayed on the display 140, for example, as illustrated in FIG. 4 by the display function of the control unit 110 so as to be announced to the user.

In the present embodiment, when the vehicle traveling route is set in advance, the control unit 110 searches the appropriate predicted passage point in the set traveling route according to the road category of the set traveling route and announces the information of the predicted passage point and the information of the predicted remaining battery amount $E_{bat}$ at the predicted passage point to the user. Accordingly, the user can easily make a plan for charging the battery on the traveling route.

Figure 5:
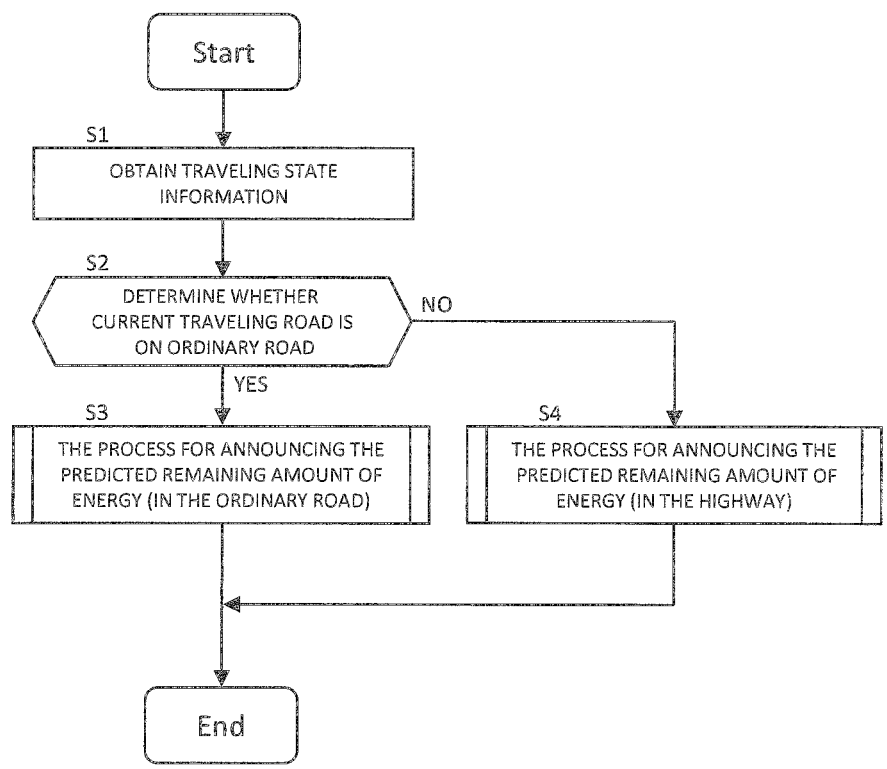
FIG. 5 is a flowchart illustrating an example of a method of announcing the information of a predicted passage point and a predicted remaining battery amount $E_{bat}$ to a user by the system for announcing the predicted remaining amount of energy of the present embodiment.

Next, the operation example of the present embodiment will be described. FIG. 5 is a flowchart illustrating an example of a method of announcing the information of the predicted passage point and the predicted remaining battery amount $E_{bat}$ to the user by the system for announcing the predicted remaining amount of energy of the present embodiment when the vehicle traveling route is not set for the vehicle.

First, in step S1, the control unit 110 obtains the information of the current vehicle position, the current vehicle traveling direction, and the current vehicle traveling road category as the traveling state information by the traveling state information obtaining function.

In step S2, the control unit 110 determines whether the road on which the vehicle currently travels is the ordinary road on the basis of the traveling state information obtained in step S1. Then, in step S2, when it is determined that the road on which the vehicle currently travels is the ordinary road, the routine proceeds to step S3. Meanwhile, in step S2, when it is determined that the road on which the vehicle currently travels is not the ordinary road, the routine proceeds to step S4.

Figure 6:
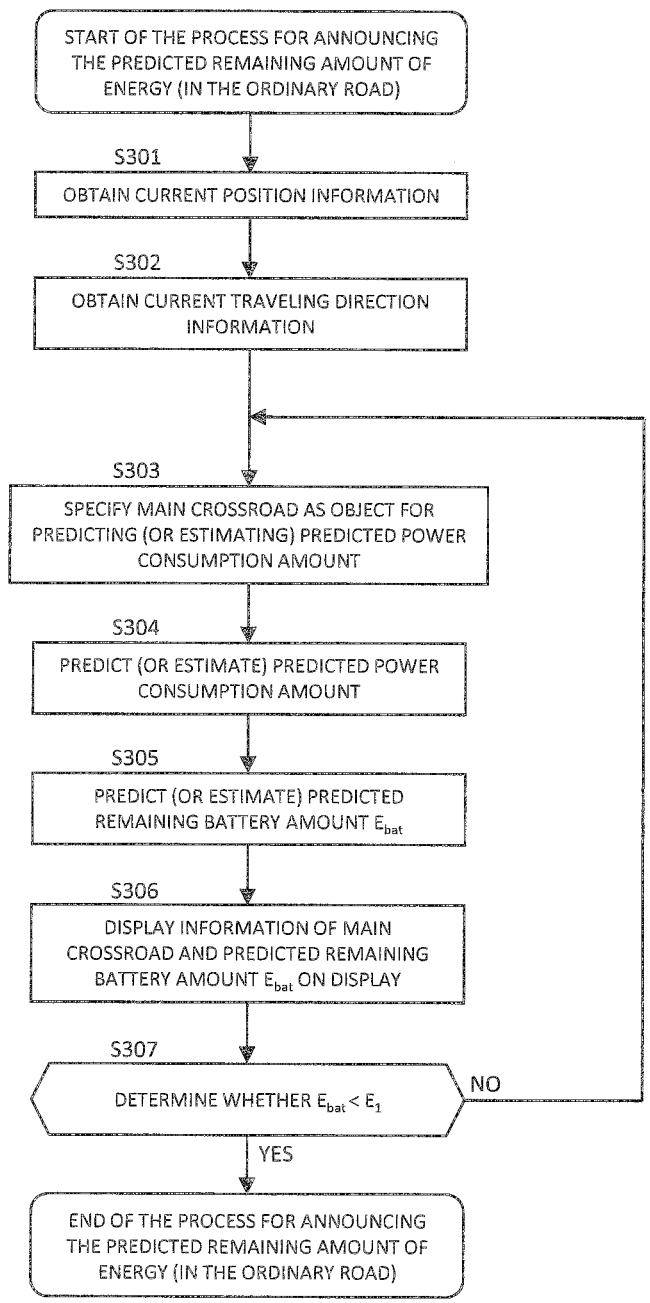
FIG. 6 is a flowchart illustrating an example of a process for announcing a predicted remaining amount of energy of the present embodiment (in a case that a vehicle travels on an ordinary road)

In step S2, when it is determined that the road on which the vehicle currently travels is the ordinary road, the routine proceeds to step S3. In step S3, the control unit 110 searches the predicted passage point and predicts (or estimates) the predicted remaining battery amount $E_{bat}$ by the process for announcing the predicted remaining amount of energy (in the ordinary road) so as to display the information of the predicted passage point and the predicted remaining battery amount $E_{bat}$ on the display 140. Here, FIG. 6 is a flowchart illustrating an example of a process for announcing the predicted remaining amount of energy (in the ordinary road). Hereinafter, the process for announcing the predicted remaining amount of energy (in the ordinary road) will be described with reference to FIG. 6.

First, in step S301 illustrated in FIG. 6, the control unit 110 obtains the current vehicle position information from the traveling state information obtained in step S1.

In step S302, the control unit 110 obtains the current vehicle traveling direction information from the traveling state information obtained in step S1.

In step S303, the control unit 110 specifies the main crossroad as the object for predicting (or estimating) the predicted power consumption amount on the basis of the information of the current vehicle position and the current vehicle traveling direction obtained in step S301 and step S302 by the predicted passage point searching function. Specifically, the control unit 110 specifies the nearest main crossroad (for example, a crossroad with a national road or a crossroad with a road having a predetermined number of lanes) existing at the front side of the current vehicle traveling direction on the basis of the current vehicle position as the starting point on the ordinary road on which the vehicle currently travels with reference to the map information stored in the database 150.

In step S304, the control unit 110 predicts (or estimates) the amount of power necessary for the vehicle from the current position to the main crossroad specified in step S303 as the predicted power consumption amount by the power consumption amount predicting (or estimating) function. Specifically, the control unit 110 reads out the own vehicle information and statistical data of the distance, the slope, and the vehicle speed from the current vehicle position to the predicted passage point on the road from the information stored in the database 150 and predicts (or estimates) the predicted power consumption amount on the basis of the read information.

In step S305, the control unit 110 predicts (or estimates) the remaining battery amount when the vehicle passes through the main crossroad on the assumption that the vehicle passes through the main crossroad as the predicted remaining battery amount $E_{bat}$. Specifically, first, the control unit 110 obtains the current vehicle remaining battery amount by the battery information obtaining function. Next, the control unit 110 obtains the remaining battery amount when the vehicle passes through the predicted passage point as the predicted remaining battery amount $E_{bat}$ in a manner such that the predicted power consumption amount predicted (or estimated) in step S304 is subtracted from the current remaining battery amount by the remaining energy amount predicting (or estimating) function.

In step S306, the control unit 110 displays the information of the predicted remaining battery amount $E_{bat}$ predicted (or estimated) in step S305 on the display 140 along with the information of the main crossroad specified in step S303 by the display function.

In step S307, the control unit 110 determines whether the predicted remaining battery amount $E_{bat}$ predicted (or estimated) in step S305 is smaller than the predetermined threshold $E_1$. As will be described below, the predetermined threshold $E_1$ is a threshold for determining whether to specify a main crossroad far from the current vehicle position (that is, a main crossroad having a small predicted remaining battery amount $E_{bat}$) in the process for announcing the predicted remaining amount of energy (in the ordinary road). The predetermined threshold $E_1$ is not particularly limited, but for example, a value of about 5 to 20% of the full charge capacity of the battery provided in the vehicle can be exemplified. Then, in step S307, when it is determined that the predicted remaining battery amount $E_{bat}$ is smaller than the predetermined threshold $E_1$, the process for announcing the predicted remaining amount of energy (in the ordinary road) ends. Subsequently, the routine returns to the flowchart illustrated in FIG. 5, and the process ends. Meanwhile, in step S307, when it is determined that the predicted remaining battery amount $E_{bat}$ is equal to or larger than the predetermined threshold $E_1$, the routine returns to step S303. At this time, in step S303, the control unit 110 specifies the next main crossroad existing at the front side of the current vehicle traveling direction from the given main crossroad as the starting point in the ordinary road on which the vehicle currently travels with reference to the map information stored in the database 150. Subsequently, the above-described processes of step S304 to step S307 are performed on the basis of the main crossroad newly searched in step S303.

Figure 7:
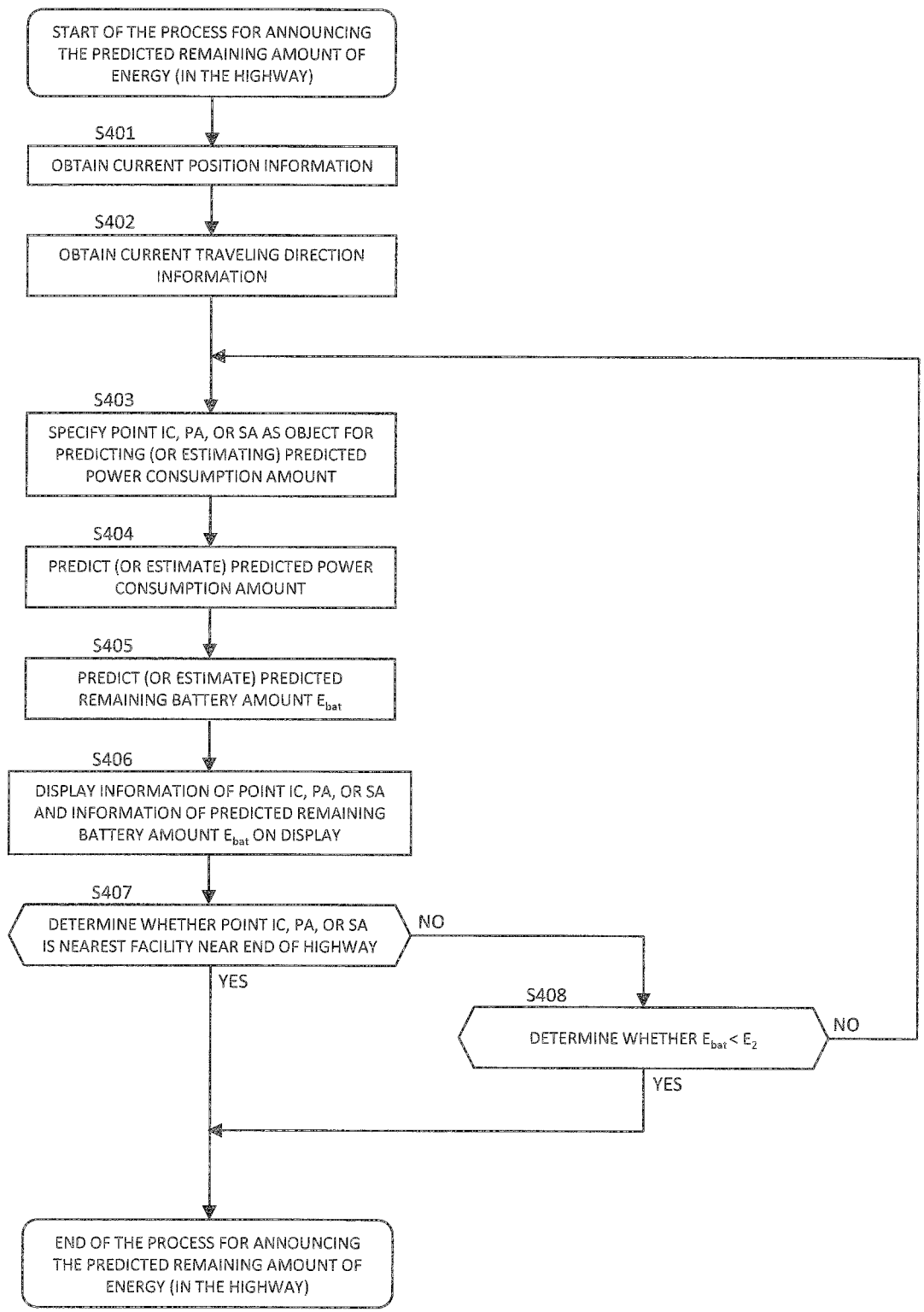
FIG. 7 is a flowchart illustrating an example of a process for announcing a predicted remaining amount of energy of the present embodiment (in a case that a vehicle travels on a highway)

Meanwhile, when it is determined that the road on which the vehicle currently travels is not the ordinary road in step S2 illustrated in FIG. 5, the routine proceeds to step S4. In step S4, the control unit 110 searches the predicted passage point and predicts (or estimates) the predicted remaining battery amount $E_{bat}$ by the process for announcing the predicted remaining amount of energy (in the highway) so as to display the information of the predicted passage point and the predicted remaining battery amount $E_{bat}$ on the display 140. Here, FIG. 7 is a flowchart illustrating an example of a process for announcing the predicted remaining amount of energy (in the highway). Hereinafter, the process for announcing the predicted remaining amount of energy (in the highway) will be described with reference to FIG. 7.

First, in step S401 and step S402 illustrated in FIG. 7, the control unit 110 obtains the information of the current vehicle position and the current vehicle traveling direction similarly to step S301 and step S302.

In step S403, the control unit 110 specifies the point IC, SA, or PA as the object for predicting (or estimating) the predicted power consumption amount on the basis of the information of the current vehicle position and the current vehicle traveling direction obtained in step S401 and step S402 by the predicted passage point searching function. Specifically, the control unit 110 specifies the nearest point IC, SA, or PA existing at the front side in the current vehicle traveling direction from the current vehicle position as the starting point in the highway on which the vehicle currently travels with reference to the map information stored in the database 150.

In step S404, similarly to step S304, the control unit 110 predicts (or estimates) the amount of power necessary for the vehicle to travel from the current position to the point IC, SA, or PA specified in step S403 as the predicted power consumption amount by the power consumption amount predicting (or estimating) function.

In step S405, similarly to step S305, the control unit 110 predicts (or estimates) the remaining battery amount when the vehicle passes through the point IC, SA, or PA on the assumption that the vehicle passes through the point IC, SA, or PA specified in step S403 as the predicted remaining battery amount $E_{bat}$.

In step S406, the control unit 110 displays the information of the predicted remaining battery amount $E_{bat}$ predicted (or estimated) in step S405 on the display 140 along with the information of the point IC, SA, or PA specified in step S403 by the display function.

In step S407, the control unit 110 determines whether the point IC, SA, or PA specified in step S403 is the nearest facility from the end of the highway. Here, as the nearest facility from the end of the highway, the point IC, SA, or PA located at a nearest position from the gateway (the node between the highway and the ordinary road or the node between the highways) provided at the end of the highway can be exemplified. Then, in step S407, when it is determined that the point IC, SA, or PA specified in step S403 is the nearest facility from the end of the highway, the process for announcing the predicted remaining amount of energy (in the highway) ends. Subsequently, the routine returns to the flowchart illustrated in FIG. 5, and the process ends. Meanwhile, in step S407, when it is determined that the point IC, SA, or PA specified in step S403 is not the nearest facility existing from the end of the highway, the routine proceeds to step S408.

In step S408, the control unit 110 determines whether the predicted remaining battery amount $E_{bat}$ predicted (or estimated) in step S405 is smaller than the predetermined threshold $E_2$. Further, the predetermined threshold $E_2$ may be the same as the threshold $E_1$ or may be a different threshold. Then, in step S408, when it is determined that the predicted remaining battery amount $E_{bat}$ is smaller than the predetermined threshold $E_2$, the process for announcing the predicted remaining amount of energy (in the highway) ends. Subsequently, the routine returns to the flowchart illustrated in FIG. 5, and the process ends. Meanwhile, in step S408, when it is determined that the predicted remaining battery amount $E_{bat}$ is equal to or larger than the predetermined threshold $E_2$, the routine returns to step S403. At this time, in step S403, the control unit 110 specifies the next point IC, SA, or PA as the starting point which are existing at the front side in the current vehicle traveling direction from the given point IC, SA, or PA in the highway on which the vehicle currently travels with reference to the map information stored in the database 150. Subsequently, the processes of step S404 to step S408 are performed on the basis of the point IC, SA, or PA newly searched in step S403.

As described above, the control unit 110 predicts (or estimates) the predicted remaining battery amount $E_{bat}$ at the predicted passage point after the predicted passage point of the main crossroad or the point IC, SA, or PA is searched. Then, the control unit 110 announces the information of the searched predicted passage point and the predicted (or estimated) predicted remaining battery amount $E_{bat}$ to the user. Accordingly, since the information of the predicted remaining battery amount $E_{bat}$ at the predicted passage point through which the vehicle is expected to pass is announced to the user, the user can obtain the information of the predicted remaining battery amount $E_{bat}$ while the user drives the vehicle and hence easily make a plan for charging the battery.

Further, the control unit 110 announces the information of the predicted passage point and the predicted remaining battery amount $E_{bat}$ to the user in a manner such that the information is displayed on the display 140. Accordingly, the user can intuitively recognize the information of the predicted passage point and the predicted remaining battery amount $E_{bat}$. For that reason, the information of the predicted passage point and the predicted remaining battery amount $E_{bat}$ is more efficiently announced to the user.

Next, a different operation example of the present embodiment will be described.

Figure 8:
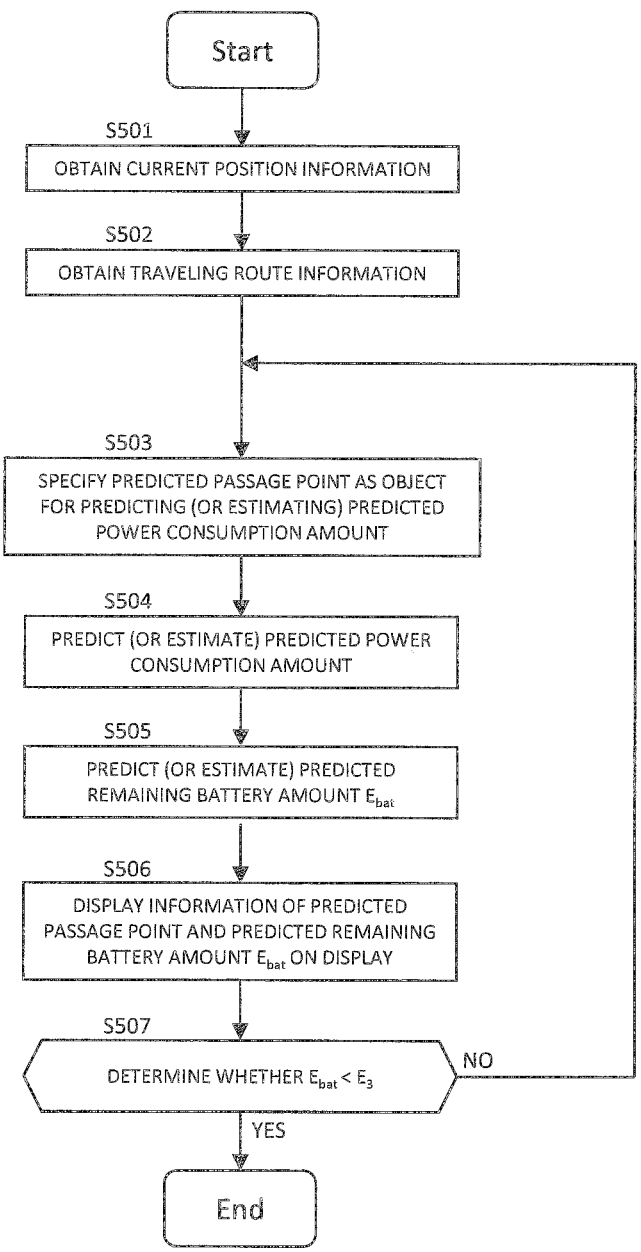
FIG. 8 is a flowchart illustrating an example of a method of announcing the information of a predicted passage point and a predicted remaining battery amount $E_{bat}$ to a user when a vehicle traveling route is set in advance by the system for announcing the predicted remaining amount of energy of the present embodiment.

FIG. 8 is a flowchart illustrating an example of a method of announcing the information of the predicted passage point and the predicted remaining battery amount $E_{bat}$ to the user by the system for announcing the predicted remaining amount of energy of the present embodiment when the vehicle traveling route is set in advance.

First, in step S501 illustrated in FIG. 8, the control unit 110 obtains the traveling state information containing the current vehicle position information by the traveling state information obtaining function.

In step S502, the control unit 110 obtains the information of the traveling route set for the vehicle. For example, in the present embodiment, a configuration in which the user sets the vehicle traveling route by the operation of the onboard device 100 and the set traveling route is stored in a memory provided in the control unit 110 may be used. At this time, the control unit 110 reads out the information stored in such a memory so as to obtain the information of the traveling route.

In step S503, the control unit 110 searches the predicted passage point for predicting (or estimating) the predicted power consumption amount from the traveling route on the basis of the information of the traveling route obtained in step S502 by the predicted passage point searching function. Specifically, the control unit 110 first specifies the section in the ordinary road and the section in the highway on the traveling route obtained in step S502. Then, the control unit 110 searches the main crossroad from the section in the ordinary road on the traveling route and searches the point IC, SA, or PA from the section in the highway on the traveling route. Then, the control unit 110 specifies the predicted passage point closest to the current vehicle position among the searched main crossroad and the points IC, SA, and PA.

In step S504, similarly to step S304, the control unit 110 predicts (or estimates) the amount of power necessary for the vehicle to travel from the current position to the predicted passage point specified in step S503 as the predicted power consumption amount by the power consumption amount predicting (or estimating) function.

In step S505, similarly to step S305, the control unit 110 predicts (or estimates) the remaining battery amount when the vehicle passes through the predicted passage point on the assumption that the vehicle passes through the predicted passage point as the predicted remaining battery amount $E_{bat}$.

In step S506, the control unit 110 displays the information of the predicted remaining battery amount $E_{bat}$ predicted (or estimated) in step S505 on the display 140 along with the information of the predicted passage point specified in step S503 by the display function.

In step S507, the control unit 110 determines whether the predicted remaining battery amount $E_{bat}$ predicted (or estimated) in step S505 is smaller than the predetermined threshold $E_3$. In addition, the predetermined threshold $E_3$ may be the same as the threshold $E_1$ or the threshold $E_2$ or may be a different threshold. Then, in step S507, when it is determined that the predicted remaining battery amount $E_{bat}$ is smaller than the predetermined threshold $E_3$, the process ends. Meanwhile, in step S507, when it is determined that the predicted remaining battery amount $E_{bat}$ is equal to or larger than the predetermined threshold $E_3$, the routine returns to step S503. At this time, in step S503, the control unit 110 specifies the next main crossroad or the point IC, SA, or PA as the predicted passage point existing at the front side of the current vehicle traveling direction from the given predicted passage point on the traveling route on the basis of the information of the traveling route obtained in step S502. Subsequently, the processes of step S504 to step S507 are performed on the basis of the predicted passage point newly searched in step S503.

As described above, the control unit 110 searches the predicted passage point according to each of the section in the ordinary road and the section in the highway after the section in the ordinary road and the section in the highway are specified on the traveling route. Further, the control unit 110 predicts (or estimates) the predicted remaining battery amount $E_{bat}$ at the predicted passage point and announces the information of the searched predicted passage point and the predicted (or estimated) predicted remaining battery amount $E_{bat}$ to the user. Therefore, even when the vehicle traveling route is set in advance, the appropriate predicted passage point is searched according to the road category on the set traveling route. For that reason, since the information of the predicted passage point and the information of the predicted remaining battery amount $E_{bat}$ at the predicted passage point are announced to the user, the user can easily make a plan for charging the battery on the traveling route.

Embodiments of the present invention have been heretofore explained, but these embodiments are described to facilitate understanding of the present invention and are not described to limit the present invention. Therefore, it is intended that the elements disclosed in the above embodiments include all design changes and equivalents to fall within the technical scope of the present invention.

For example, in the above-described embodiment, an example in which the control unit 110 searches the predicted passage point from the road (the ordinary road or the highway) on which the vehicle currently travels is described. However, the control unit 110 may search the predicted passage point from the road on which the vehicle currently travels as well as a different road connected to the road. For example, the control unit 110 may set a predetermined area in the current vehicle traveling direction from the current vehicle position as the starting point on the basis of the traveling state information obtained by the traveling state information obtaining function and search the predicted passage point from the set predetermined area. Here, the predetermined area is not particularly limited, but for example, a fan-shaped area having an angle of about 10 to 30° with respect to the current vehicle traveling direction using the current vehicle position as the starting point can be exemplified. Accordingly, even when the vehicle traveling route is not set, the information of the searched predicted passage point in an area through which the vehicle is more likely to pass and the information of the predicted remaining battery amount $E_{bat}$ at the predicted passage point are announced to the user. For that reason, the control unit 110 can announce appropriate information to the user without any excessive guidance.

Further, in the above-described embodiment, an example in which the point IC, SA, or PA on the highway is specified as the predicted passage point when the road on which the vehicle travels is the highway is described. However, as the predicted passage point in the highway, the gateway of the highway (the node between the highway and the ordinary road or the node between the highways) may be specified. At this time, the control unit 110 can specify the gateway of the highway as the predicted passage point in step S403 of the flowchart illustrated in FIG. 7. When the gateway of the highway is specified as the predicted passage point, the control unit 110 determines whether the gateway of the highway specified as the predicted passage point is the gateway provided at the end of the highway in step S407 instead of the above-described determination.

Alternatively, in the above-described embodiment, an example in which the control unit 110 displays the information of the predicted passage point and the predicted remaining battery amount $E_{bat}$ on the display 140 so as to announce the information to the user is described. However, the method in which the control unit 110 announces the information of the predicted passage point and the predicted remaining battery amount $E_{bat}$ to the user is not particularly limited. For example, a method of announcing the information by the voice of a speaker may be used.

Further, in the above-described embodiment, an example in which the traveling energy of the power source of the vehicle is obtained by the battery is described. However, the traveling energy may be obtained from, for example, gasoline, diesel, energy obtained by the combination of gasoline or diesel and a battery, methanol fuel of a fuel cell, or gas fuel such as a high-pressure hydrogen gas. Accordingly, the control unit 110 can predict (or estimate) the predicted remaining amount of energy on the assumption that the vehicle passes through the predicted passage point on the basis of the remaining amount of such a traveling energy and announce the information of the predicted remaining amount of energy along with the information of the predicted passage point.

Further, in the above-described embodiment, an example of a scene is illustrated in which the energy supplying facility for supplying traveling energy to the vehicle is the charging facility, but the energy supplying facility is not particularly limited. For example, a gasoline station or a hydrogen station may be used.

Further, in the above-described embodiment, the onboard device 100 and the information center 200 directly communicate with each other. However, the onboard device 100 may transmit and receive the information to and from the information center 200 by the use of cloud computing. Furthermore, the predicted passage point may be searched and the predicted remaining battery amount $E_{bat}$ may be predicted (or estimated) so as to announce the information of the predicted passage point and the predicted remaining battery amount $E_{bat}$ to the user as described above by a PC or a smart phone instead of the onboard device 100.

In the above-described embodiment, the control unit 110 corresponds to the obtaining unit, the searching unit, the predicting (or estimating) unit, the announcing unit, and the detecting unit of the present invention.

I claim:

1. A system for generating information about predicted remaining amount of energy, comprising a processing circuitry configured to:
   obtain traveling state information which contains current vehicle position information;
   search a predicted passage point through which the vehicle is predicted to pass in a future on a basis of the traveling state information when a vehicle traveling route is not set;
   predict a predicted remaining amount of energy, the predicted remaining amount of energy being a predicted amount of traveling energy remaining at the time when the vehicle passes the predicted passage point; and
   control to provide information about the predicted remaining amount of energy and the predicted passage point corresponding to the predicted remaining amount of energy for a user.

2. The system according to claim 1, wherein the traveling state information further contains road category information containing information about categories of roads on which the vehicle travels, the categories containing an ordinary road and a highway, and the processing circuitry is configured to:
   determine whether a road on which the vehicle travels is the ordinary road or the highway on the basis of the road category information;
   search a crossroad through which the vehicle is predicted to pass as the predicted passage point when the road on which the vehicle travels is determined to be the ordinary road; and
   search at least one of a gateway, a junction or a parking allowed space through which the vehicle is predicted to pass in the highway as the predicted passage point when the road on which the vehicle travels is determined to be the highway.

3. The system according to claim 1, wherein the traveling state information further contains current vehicle traveling direction information, and the processing circuitry configured to:
   set a predetermined region which extends from a current vehicle position toward a current vehicle traveling direction on the basis of the current vehicle position information and the current vehicle traveling direction information; and
   search the predicted passage point out of the predetermined region.

4. The system according to claim 1, wherein the processing circuitry is configured to:
   specify an area of an ordinary road or a highway on the vehicle traveling route on the basis of the current vehicle position information and the vehicle traveling route information when the vehicle traveling route is set;
   subsequently search a crossroad through which the vehicle is predicted to pass as the predicted passage point in the area of the ordinary road on the vehicle traveling route; and
   search at least one of a gateway, a junction or a parking allowed space through which the vehicle is predicted to pass in the highway as the predicted passage point in the area of the highway on the vehicle traveling route.

5. The system according to claim 1, further comprising:
   a display for displaying the information about the predicted remaining amount of energy and the predicted passage point to the users.

6. The system according to claim 5, wherein the processing circuitry is configured to control the display so that the information about the predicted passage point is displayed in a form so that the user recognizes a position of the predicted passage point and the information about the predicted remaining amount of energy corresponds to information about the predicted passage point.

7. The system according to claim 1, wherein the processing circuitry is configured to:
   detect an energy supplying facility existing within a predetermined distance from each of the predicted passage point; and
   control to provide the information about the energy supplying facility for the user in addition to the information about the predicted remaining amount of energy and the predicted passage point.

8. The system according to claim 7, wherein the processing circuitry is configured to:
   predict predicted passage time of each of the predicted passage point, the predicted passage time being time at which the vehicle passes through the predicted passage point, in addition to searching the predicted passage point;
   detect an available energy supplying facility among the energy supplying facility which exists within the predetermined distance from the predicted passage point, the available energy supplying facility being a facility which is available in predicted passage time at which the vehicle passes through the predicted passage point; and
   control to provide information of the available energy supplying facility for the user.

9. The system according claim 1, wherein the vehicle traveling route can be set based on an operation on a device of the vehicle by a user of the vehicle.

10. A method for generating information about predicted remaining amount of energy, the method comprising:
    searching a predicted passage point through which a vehicle is predicted to pass in a future when a vehicle traveling route is not set;
    predicting a predicted remaining amount of energy, the predicted remaining amount of energy being a predicted amount of traveling energy remaining when the vehicle passes through the predicted passage point; and controlling to provide information about the predicted remaining amount of energy and the predicted passage point corresponding to the predicted remaining amount of energy for a user.

11. A device for generating information about predicted remaining amount of energy, the device comprising:
a processing circuitry configured to:
search a predicted passage point through which a vehicle is predicted to pass in a future when a vehicle traveling route is not set;
predict a predicted remaining amount of energy, the predicted remaining amount of energy being a predicted amount of traveling energy remaining when the vehicle passes through the predicted passage point; and
control to provide information about the predicted remaining amount of energy and the predicted passage point corresponding to the predicted remaining amount of energy for a user.

\* \* \* \* \*